United States Patent
Ohara (10) Patent No.: US 8,031,350 B2
(45) Date of Patent: Oct. 4, 2011

(54) DATA PROCESSING APPARATUS, SYSTEM CONTROL METHOD AND SYSTEM

(75) Inventor: Eiji Ohara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1435 days.

(21) Appl. No.: 11/501,781

(22) Filed: Aug. 10, 2006

(65) Prior Publication Data

US 2007/0050772 A1  Mar. 1, 2007

(30) Foreign Application Priority Data

Aug. 25, 2005  (JP) ................................. 2005-244747

(51) Int. Cl.
*G06F 3/12*  (2006.01)

(52) U.S. Cl. ..................... 358/1.14; 358/1.13; 358/1.15; 399/82; 399/88

(58) Field of Classification Search ........ 358/1.13–1.16; 399/82, 88

See application file for complete search history.

(56) References Cited

U.S. PATENT DOCUMENTS

| | | | | |
|---|---|---|---|---|
| 5,696,499 A | * | 12/1997 | Mitsuhashi et al. | 340/825.69 |
| 6,104,886 A | * | 8/2000 | Suzuki et al. | 396/429 |
| 6,305,769 B1 | * | 10/2001 | Thayer et al. | 347/1 |
| 6,984,079 B2 | | 1/2006 | Okada et al. | |
| 2002/0131069 A1 | * | 9/2002 | Wanda | 358/1.14 |
| 2004/0032619 A1 | * | 2/2004 | Izaki | 358/1.16 |
| 2005/0055641 A1 | * | 3/2005 | Machida | 715/734 |
| 2006/0028661 A1 | * | 2/2006 | Uruma | 358/1.6 |
| 2008/0316519 A1 | * | 12/2008 | Suzuki et al. | 358/1.13 |

FOREIGN PATENT DOCUMENTS

| | | | |
|---|---|---|---|
| JP | 2001-265174 A | | 9/2001 |
| JP | 2001265174 A | * | 9/2001 |
| JP | 2004-241864 | | 8/2004 |
| WO | 03-036459 A | | 5/2003 |

* cited by examiner

*Primary Examiner* — Chan Park (74) *Attorney, Agent, or Firm* — Fitzpatrick, Cella, Harper & Scinto

(57) ABSTRACT

If a user specifies shutdown of the power supply of an apparatus from a console, another apparatus connected to the same network is notified so as not to issue a request for a new shared job, and it is determined whether a scheduled shared job exists. The display on a display screen is changed in accordance with the result of the determination. If it is determined that a shared job exists, shutdown of the power supply is controlled in accordance with the status of execution of the shared job.

25 Claims, 9 Drawing Sheets

DATA PROCESSING APPARATUS, SYSTEM CONTROL METHOD AND SYSTEM

BACKGROUND OF THE INVENTION

1. Field of the Invention

The present invention relates to a data processing apparatus, system control method and system. More particularly, the invention relates to control at power shutdown in a data processing apparatus that is capable of executing processing of a shared job requiring cooperative operation using another data processing apparatus.

2. Description of the Related Art

An apparatus referred to as a multifunction peripheral (MFP) has been developed as office automation (OA) equipment in recent years and joins such devices as image readers (scanners) and copiers. An MFP has multiple functions such as a scanning function, copying function, facsimile function and printing function.

In an effort to exploit the functions of such OA equipment effectively, it has been proposed to execute a variety of shared jobs by utilizing a plurality of devices connected to a network.

For example, cascade copying is known in the art and is executable in a system having an image reader, a first MFP locally connected to the reader and a second MFP connected to the first MFP via a network. Cascade copying is a job in which image data that has been scanned in by the image reader is printed simultaneously by the first and second MFPs.

Further, "remote copying" is also commonly performed. Remote copying utilizes an image reader and a printing apparatus (printer) connected via a network. Image data that has been scanned in by the image reader is transmitted to the printing apparatus via the network, and the printer apparatus performs printing based upon the image data.

It is predicted that such shared jobs will increase greatly in the future. For example, shared jobs are effective in a case where high-value optional functions are shared by a plurality of devices over a network. These high-value options make possible various types of image processing such as PDF processing, TIFF processing, OCR processing, compression/expansion processing and encryption processing. In a concrete example of such a shared job, image data that has been acquired by a local device is transmitted to a specific remote device via a network and is subjected to image processing by shared optional functions. The image data sent back is subsequently stored in the local device or printed out.

A shared job referred to as "pull printing" also is possible. In pull printing, image data that has been stored in a remote device is retrieved by a local device via a network, this image data is transmitted to the local device and is printed by the local device.

Although it is possible to shut down (turn off) the power supply of each device that takes part in executing such shared jobs, the timing at which the power supplies are turned off is difficult.

The specification of Japanese Patent Application Laid-Open No. 2004-241864 describes processing at power shutdown in two image processing devices that operate in tandem as master and slave. If the power supply of the master device has been turned off, the slave device abandons the scheduled job, moves up the succeeding job and executes it preferentially. If the power supply of the slave device is turned off, on the other hand, the master device is decoupled from the slave device and operates independently.

However, master and slave roles are not fixed in a device that takes part in executing a shared job. That is, there are cases where even though the device operates as a master in relation to a certain shared job, it operates as a slave in relation to another shared job. This means that it is difficult to apply processing of the kind described in the prior-art application mentioned above.

If the power supply of either device is forcibly turned off during execution of a shared job, a mismatch occurs between the devices during execution of the shared job, the shared job is suspended and an error occurs in the worst case.

On the other hand, in order to avoid power shutdown during execution of a shared job, the status of job execution must be monitored at all times. If shared jobs are requested one after another from other devices connected over the network in such case, there will no longer be a break between shared jobs and it will be difficult to shut down power.

SUMMARY OF THE INVENTION

Accordingly, an object of the present invention is to so arrange it that when a shared job requiring cooperative operation using another data processing apparatus is executed, the power supply of each data processing apparatus can be shut down without affecting a shared job currently being executed.

According to an aspect of the present invention, the foregoing object is attained by providing a data processing apparatus capable of executing processing of a specific job requiring cooperative operation using another data processing apparatus, comprising: an acceptance unit adapted to accept from an operator a shutdown request to shut down a power supply of said data processing apparatus; and a controller adapted to, in a case where a specific job to be processed by said data processing apparatus exists, enable shutdown of the power supply of said data processing apparatus following end of processing of the specific job by said data processing apparatus.

According to an aspect of the present invention, the foregoing object is attained by providing a control method in a system so adapted that processing of a specific job requiring cooperative operation using a plurality of data processing apparatuses is capable of being executed, comprising the steps of: accepting from an operator a shutdown request to shut down a power supply of a data processing apparatus capable of executing processing of the specific job; and in a case where a specific job to be processed by said data processing apparatus capable of executing processing of the specific job exists, enabling shutdown of the power supply of said data processing apparatus following end of processing of the specific job by said data processing apparatus.

According to an aspect of the present invention, the foregoing object is attained by providing a system capable of executing processing of a specific job requiring cooperative operation using a plurality of data processing apparatuses is capable of being executed, comprising: an acceptance unit for accepting from an operator a shutdown request to shut down a power supply of a data processing apparatus capable of executing processing of the specific job; and a controller which, in a case where a specific job to be processed by a data processing apparatus capable of executing the specific job of exists, is for enabling shutdown of the power supply of said data processing apparatus following end of processing of the specific job by said data processing apparatus.

Further features of the present invention will become apparent from the following description of exemplary embodiments (with reference to attached drawings).

DESCRIPTION OF THE EMBODIMENTS

Preferred embodiments of the present invention will be described exemplarily with reference to the accompanying drawings. It should be noted that the structural elements described in the following embodiments are illustrative and the scope of the present invention is not limited solely to these elements.

First Embodiment

Figure 1:
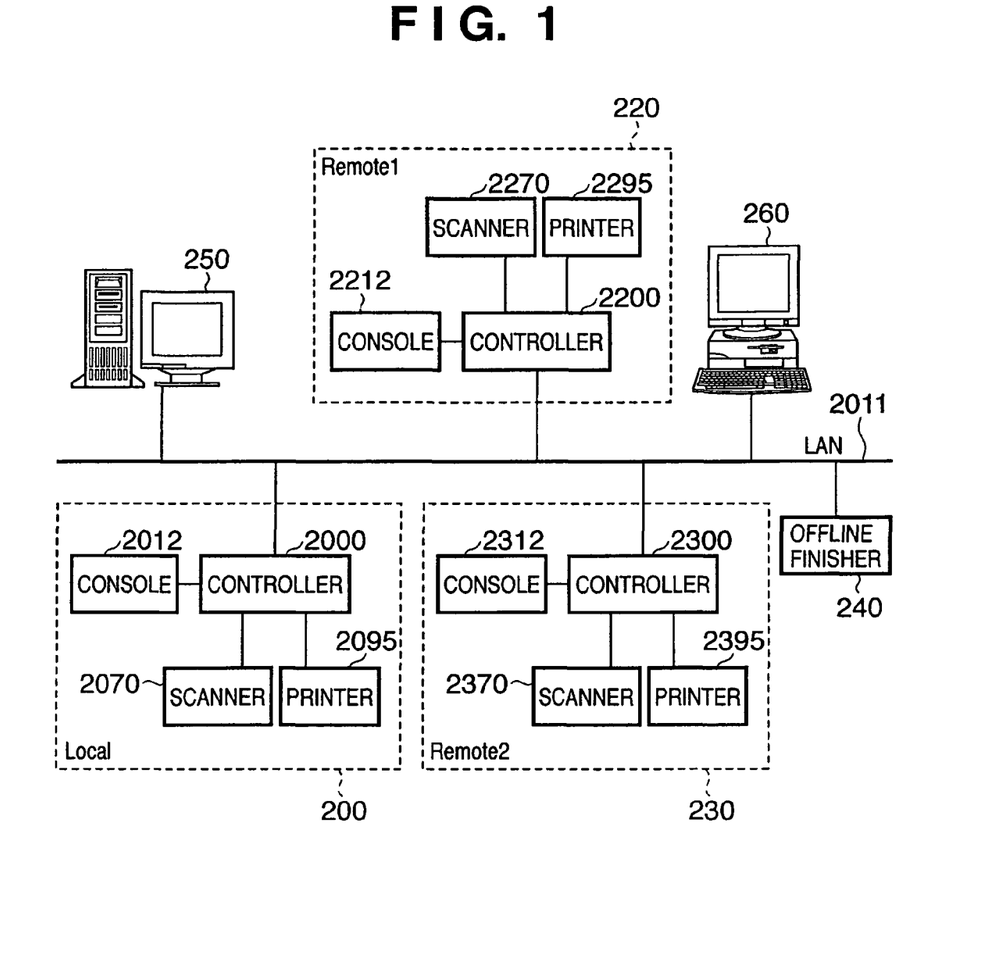
FIG. 1 is a block diagram illustrating the general configuration of an image processing system according to a first embodiment of the present invention.

FIG. 1 is a block diagram illustrating the general configuration of an image processing system according to a first embodiment of the present invention. The image processing system of this embodiment has three image input/output apparatuses 200, 220, 230, an offline finisher 240, a server computer 250 and a personal computer 260. These are connected to a LAN 2011.

The image input/output apparatus 200 comprises a scanner 2070 serving as an image input device, a printer 2095 serving as an image output device, a controller 2000 and a console 2012 serving as a user interface. The scanner 2070, printer 2095 and console 2012 are connected to the controller 2000.

The image input/output apparatuses 220 and 230 have components similar to those of the image input/output apparatus 200. That is, the image input/output apparatuses 220 and 230 respectively comprise scanners 2270 and 2370; printers 2295 and 2395; and consoles 2212 and 2312. These components are connected to controllers 2200, 2300, respectively. The offline finisher 240 subjects printing paper to post-processing offline. The server computer 250 has a large storage capacity and operates as storage means. The personal computer 260 allows the user to issue command and make inputs.

A case where a service provided by each individual apparatus is to read in (input) an image using the scanner 2070 of the image input/output apparatus 200 and print (output) the image using the printer 2095 is referred to as "local copying". A service thus completed within the image input/output apparatus to which the job has been input is referred to as a "local" service (job).

In this embodiment, however, it is also possible to utilize these system components to implement a service offered cooperatively between the apparatuses connected to the network and not just a service provided by each individual apparatus (such a service is a "shared job").

Among these services is processing referred to as "remote copying". This is processing in which an image is read by the scanner 2070 of the image input/output apparatus 200, for example, and is printed by the printer 2095 of the image input/output apparatus 220 or by the printer 2395 of the image input/output apparatus 230. A service thus provided utilizing a function of an apparatus other than the image input/output apparatus to which a job has been input is referred to as a "remote" service (job).

Furthermore, an image is read by the scanner 2070 of the image input/output apparatus 200 and is printed simultaneously by the printers 2095 and 2295 of the image input/output apparatuses 200 and 220, respectively. Processing in this case is referred to as "cascade copying".

It is possible for an image (stored image) that has been stored in a large-capacity storage device of the server computer 250 to be retrieved and output by the image input/output apparatus 200, 220 or 230. This processing is referred to as "pull printing". The object of pull printing may be a stored image of an image input/output apparatus, in which case a stored image that has been stored on a hard-disk drive (described later) of the image input/output apparatus 220 is retrieved and output by the image input/output apparatus 200.

Further, it is possible to read an image by the scanner 2070 of the image input/output apparatus 200, for example, and store the image data in the personal computer 260 in order that it may be utilized by an individual user. Such processing is referred to as "push scanning".

Furthermore, it is also possible to read an image using the scanner 2070 of the image input/output apparatus 200 and distribute the thus obtained computerized data by e-mail via the LAN 2011. This processing is referred to as "scan to e-mail". At this time the computerized data may be distributed upon converting it to a data of a certain format, such as PDF data, TIFF data, OCR data, JPEG data and encrypted data, etc. In this case, even if the image input/output apparatus 200 does not possess such a conversion function, it will suffice if another apparatus has the conversion function that it can share over the network. This means that the image input/output apparatus 200 can transmit electronic data via the LAN 2011 and have the electronic data sent back after execution of the format conversion.

Figure 2:
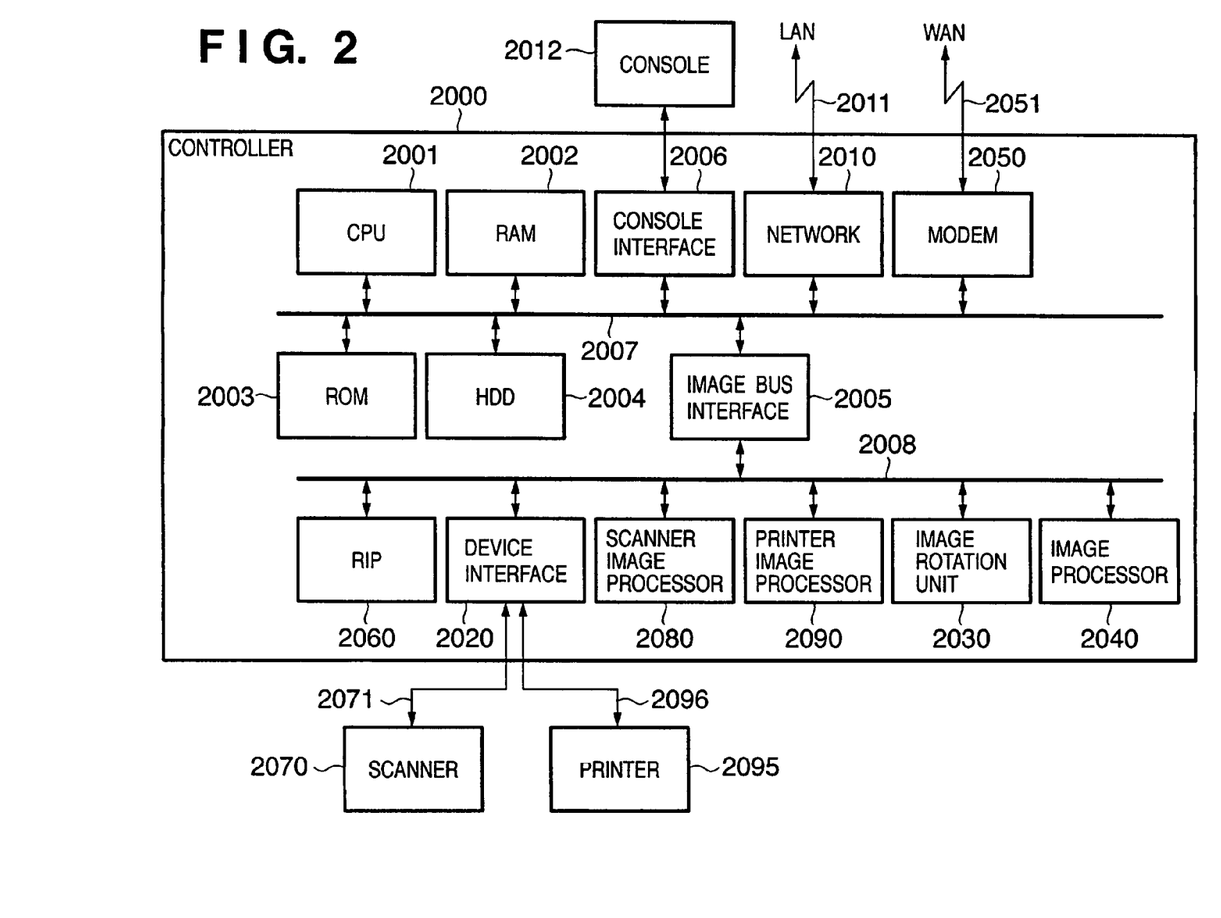
FIG. 2 is a block diagram illustrating in detail the internal structure of a controller in an image input/output apparatus shown in FIG. 1.

FIG. 2 is a block diagram illustrating in detail the internal structure of the controller 2000 in the image input/output apparatus 200. The controller 200 is connected via a bus 2071 to the scanner 2070 serving as an image input device and via a bus 2096 to the printer 2095 serving as an image output device. By being connected to the LAN 2011 and a public line (WAN) 2051, the controller 2000 control input and output of image information and device information.

A CPU 2001 is a controller for controlling the overall system. A RAM 202 is a system work memory needed for the CPU 2001 to operate. This is also an image memory for storing image data temporarily. A ROM 2003 stores the booting program of the system. A hard-disk drive (HDD) 2004 stores system software and image data, etc.

A console interface (I/F) 2006, which is for interfacing the console (user interface) 2012, outputs image data, which is to be displayed on the console 2012, to the console 2012. The console interface 2006 further functions to transmit information, which the user of the system has entered from the console 2012, to the CPU 2001. A network unit 2010 is connected to the LAN 2011 and performs the input and output of information. A modem 2050 is connected to the public line 2051 and inputs and outputs information. The devices mentioned above are disposed on a system bus 2007.

An image bus interface (I/F) 2005 is a bus bridge for connecting the system bus 2007 and an image bus 2008, which transfers image data at high speed, and for converting the data structure. The image bus 2008 is constituted by a PCI bus or IEEE 1394.

In each device disposed on the image bus 2008, a raster image processor (RIP) 2060 expands PDL (Page Description Language) code into a bitmap image. A device interface (I/F) 2020 connects the scanner 2070 or printer 2095 to the controller 2000 and subjects the image data to a synchronous/asynchronous conversion. A scanner image processor 2080 subjects input image data to correction, manipulation and editing. A printer image processor 2090 subjects output image data from the printer to correction and resolution conversion, etc., that conform to the printer 2095. An image rotation unit 2030 rotates image data. An image processor 2040 subjects image data to compression/expansion processing such as JPEG, JBIG, MMR or MH compression/expansion, or applies a format conversion such as PDF, TIFF, OCR or encryption.

Figure 3:
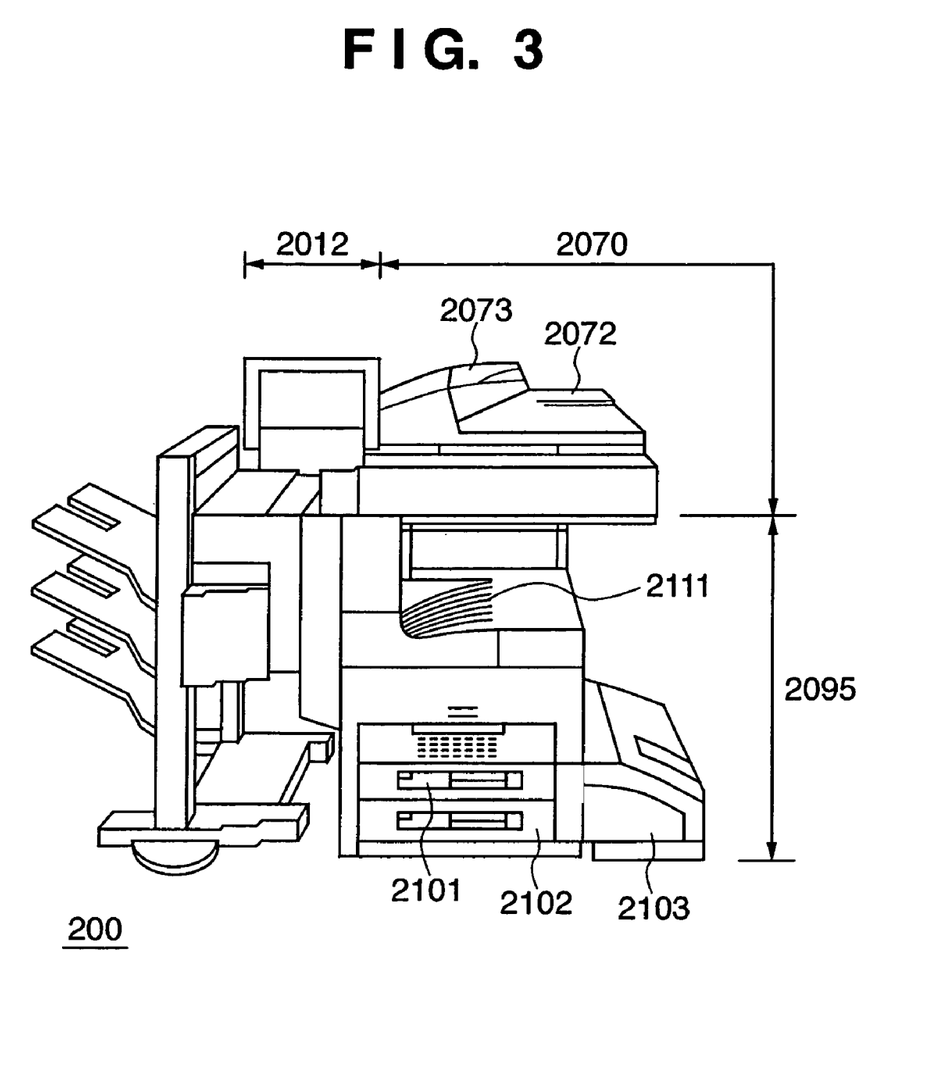
FIG. 3 is an external view illustrating the structure of the image input/output apparatus as seen externally.

FIG. 3 is an external view illustrating the structure of the image input/output apparatus 200 as seen externally. The scanner 2070, which is the image input device, illuminates the image of a document and scans the document using a CCD line sensor (not shown) to convert the reflected light from the document to an electric signal representing raster-image data. Paper documents are placed on a tray 2073 of a document feeder 2072 and the user uses the console 2012 to enter a read-start command. In response, the CPU 2001 of the controller 200 applies the command to the scanner 2070 via the bus 2071. The document feeder 2072 feeds the documents one sheet at a time and the scanner 2070 reads the document images.

The printer 2095 serving as the image output device records the raster image data, which has been received from the controller 2000 via the bus 2096, on paper as an image. Any printing technique may be used in the printer. Examples are electrophotography, which employs a photosensitive drum or belt, or an ink-jet technique, which forms an image directly on paper by jetting ink from an array of micronozzles.

The printing operation is started up in response to a command received from the CPU 2001 of the controller 2000 via the bus 2096. The printer 2095 possesses a plurality of supply bins that make it possible to select paper of different sizes or orientations, as well as paper cassettes 2101, 2102, 2103 and 2104 corresponding to these bins. A drop tray 2111 receives the paper on which printing has been completed. It should be noted that the recording medium stored in the cassettes 2101, 2102, 2103 and 2104 is not limited to printing paper and may be OHP sheets, etc.

Figure 4:
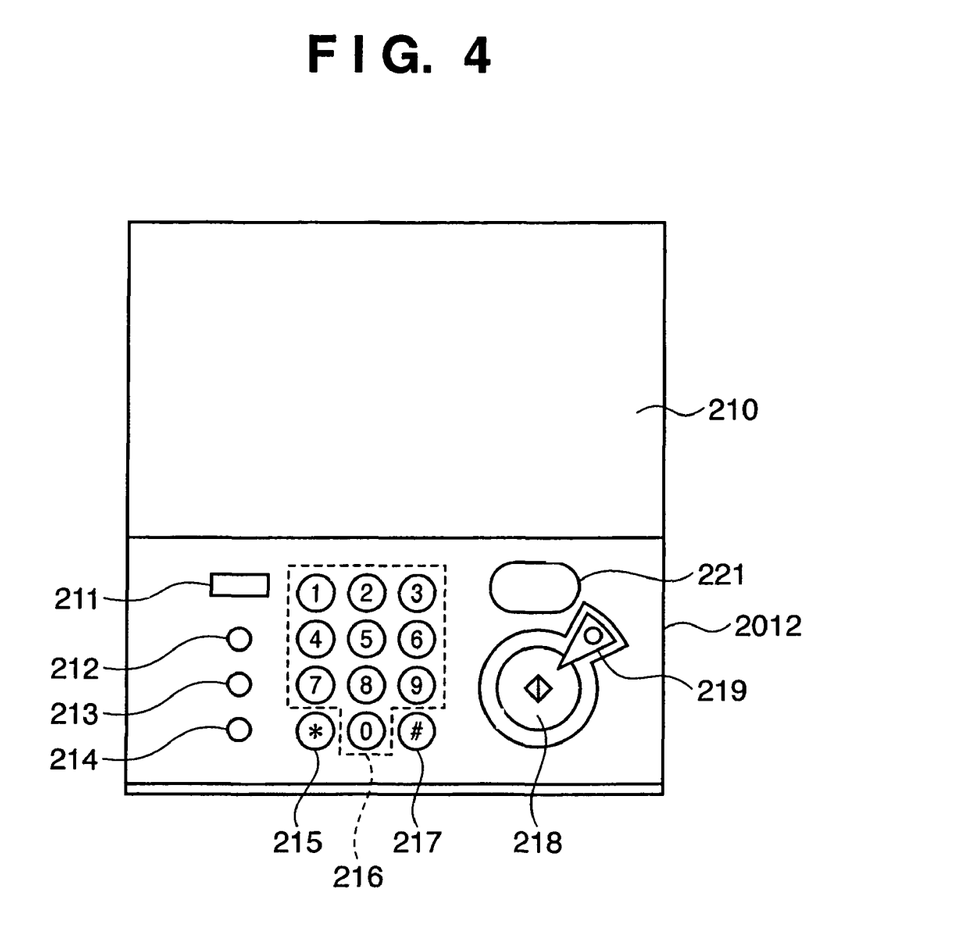
FIG. 4 is a plan view illustrating the structure of a console of the image input/output apparatus.

FIG. 4 is a plan view illustrating the structure of the console 2012 of the image input/output apparatus 200.

As illustrated in FIG. 4, the upper part of the console 2012 has a liquid crystal screen 210 for displaying images and text, and the lower part of the console has an array of various operating keys. The operating keys are a reset key 211, guide key 212, user mode key 213, interrupt key 214, PIN key 215, numeric keys 216, clear key 217, start key 218, stop key 219 and power on/off key 221.

The liquid crystal screen 210 displays settings and the operating status of the apparatus. It is also possible to input setting information by pressing soft keys or the like on a touch-sensitive panel (not shown) mounted on the liquid crystal screen 210.

The reset key 211 resets settings to an initial mode. The guide key 212 causes operating instructions to be displayed on the liquid crystal screen 210. The user mode key 213 is for establishing a mode in which the apparatus can be set in various ways. The interrupt key 214 is for temporarily halting apparatus operation and allowing another job operation to be performed. In a PIN mode in which the apparatus cannot be used unless a PIN is entered, the PIN key 215 is for entering the PIN after it has been input using the numeric keys 216. The numeric keys 216 are for inputting the number of copies or the values of various settings. The clear key 217 is for clearing values that have been input. The start key 218 is for instructing the apparatus to start an image input/output operation. The stop key 219 is for stopping an image input/output operation. The power on/off key 221, which is a soft switch, is primarily for turning the apparatus power supply on and off. However, the power on/off key 221 is also capable of turning off the main power source by being held depressed, by way of example.

(Processing Executed when Turning Off Power)

Figure 5:
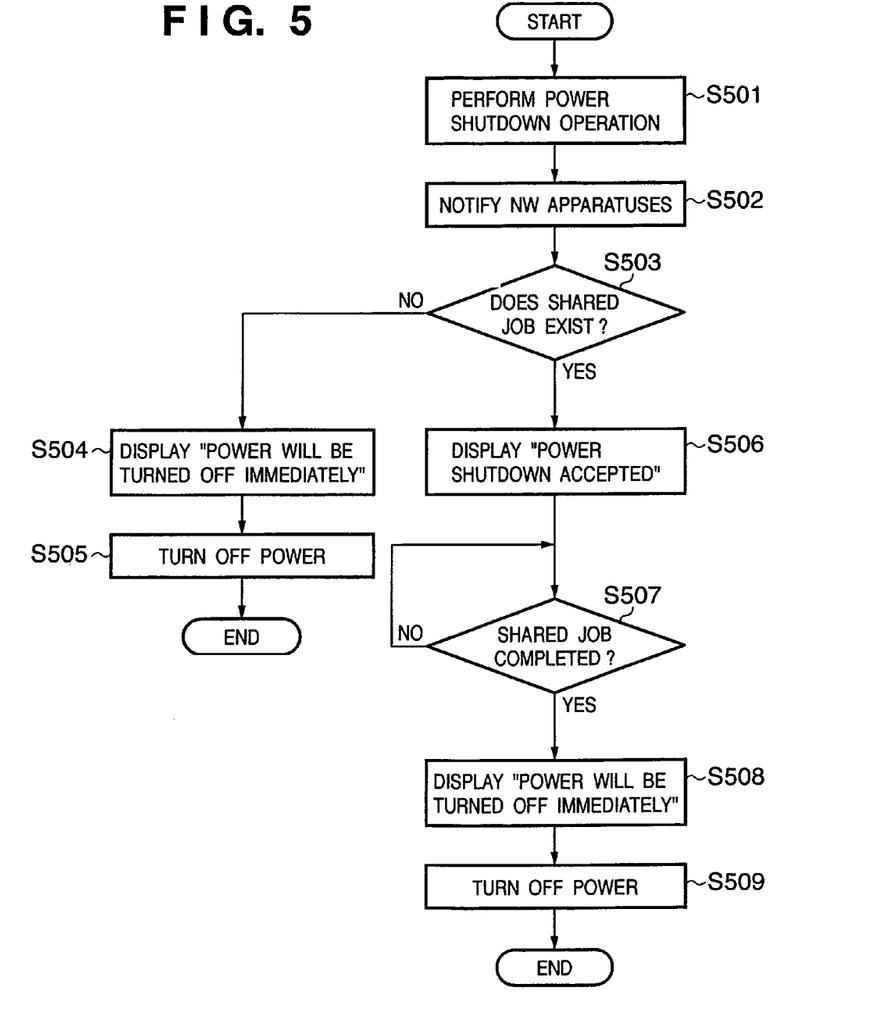
FIG. 5 is a flowchart illustrating processing executed at power shutdown in the first embodiment.

Processing executed when power is turned off in the image processing system of this embodiment will now be described. FIG. 5 is a flowchart illustrating processing executed at power shutdown in this embodiment.

Described will be processing in an image input/output apparatus that is the target of a shared job such as remote copying, cascade copying, pull printing, push printing and scan-to-mail, where use is made of at least two image input/output apparatuses. Here the shared jobs will be a job that requires transmission of data to another image input/output apparatus, a job in which a printing operation is borne by a plurality of image input/output apparatuses, and a job that requires a image input/output apparatus to transmit data necessary for a printing operation performed only by another image input/output apparatus. The processing shown in FIG. 5 is executed in each of the image input/output apparatuses 200, 220 and 230.

The power on/off key 221 of the image input/output apparatus is held depressed so that a power shutdown operation is carried out (S501).

When power shutdown is performed by the operator, preparations are made for turning off the main power supply of the apparatus. In this embodiment, however, one preparatory operation is to inform other apparatuses connected to the network of power shutdown in such a manner that a new shared job will not be generated (S502).

Figure 6:
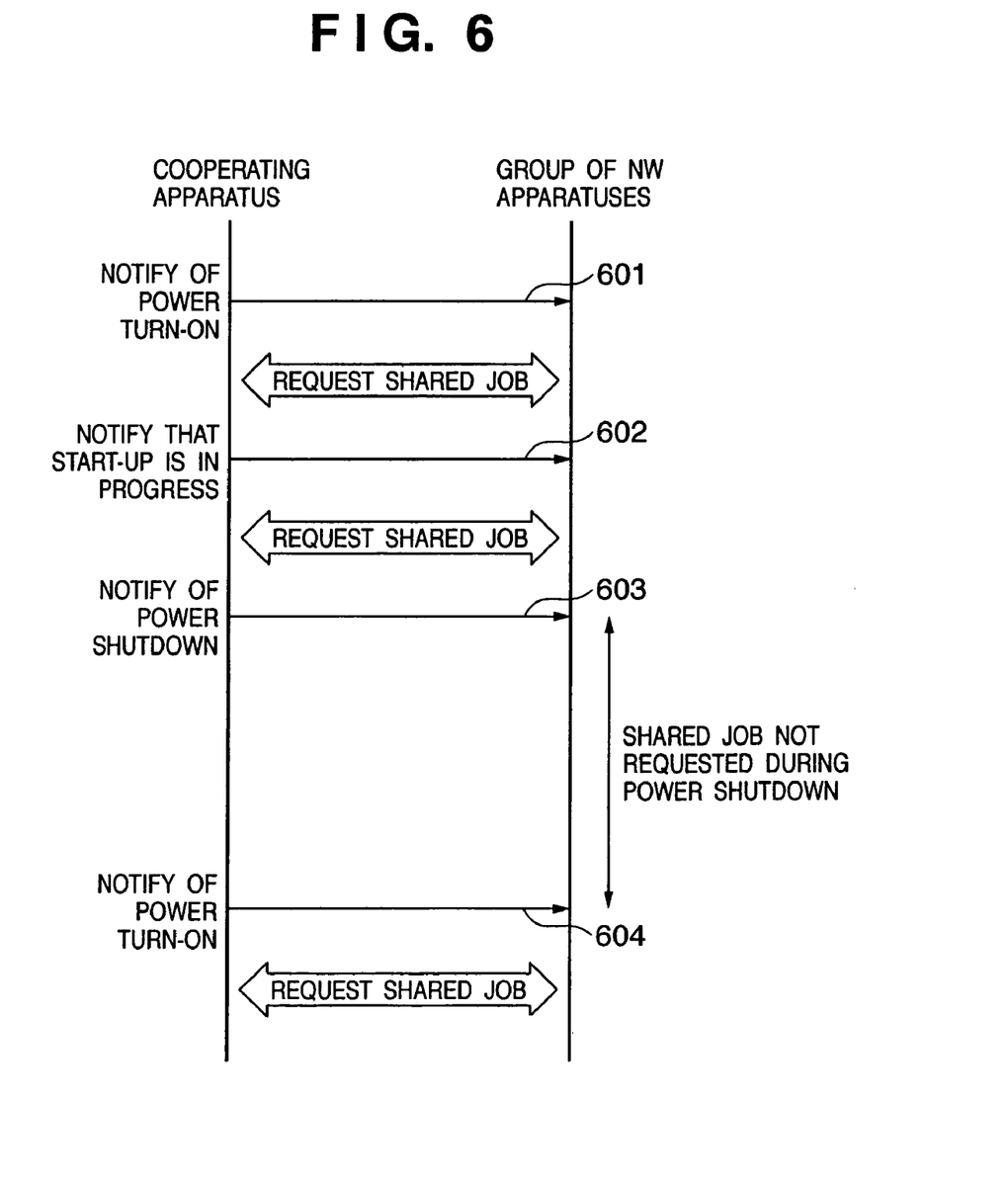
FIG. 6 is a conceptual view useful in describing notification of power shutdown in the first embodiment.

FIG. 6 is a conceptual view useful in describing notification of power shutdown in this embodiment. The vertical axis in FIG. 6 indicates elapsed time. When power is introduced to an apparatus that is the target of a shared job (namely to a cooperating apparatus), the other apparatuses (NW apparatuses) connected on the network are notified of power turn-on (601). As a result, the group of NW apparatuses starts polling regarding the cooperating apparatus, acquires information concerning the cooperating apparatus and can request a shared job by the information acquired from the cooperating apparatus. Conversely, a cooperating apparatus is capable of requesting a shared job in accordance with apparatus information acquired from the group of NW apparatuses. The cooperating apparatus periodically notifies of the fact that start-up is in progress (602) and notifies the group of NW apparatuses of the fact that execution of the shared job is possible.

When the power shutdown operation is performed with regard to the cooperating apparatus, as described above, the cooperating apparatus notifies the group of NW apparatuses of power shutdown (603). The group of NW apparatuses so notified of power shutdown inhibit the requesting of new jobs with respect to the cooperating apparatus. When the power supply of the cooperating apparatus is subsequently turned on again (604), it becomes possible for the group of NW apparatuses to request a shared job.

Thus, according to this embodiment, it is assured that a new shared job will not be generated with respect to an apparatus at which the power shutdown operation has been performed.

With reference again to FIG. 5, it is determined whether there is a shared job (S503). In other words, when a shared job is already being executed or whether execution of a shared job is scheduled is determined.

Figure 7:
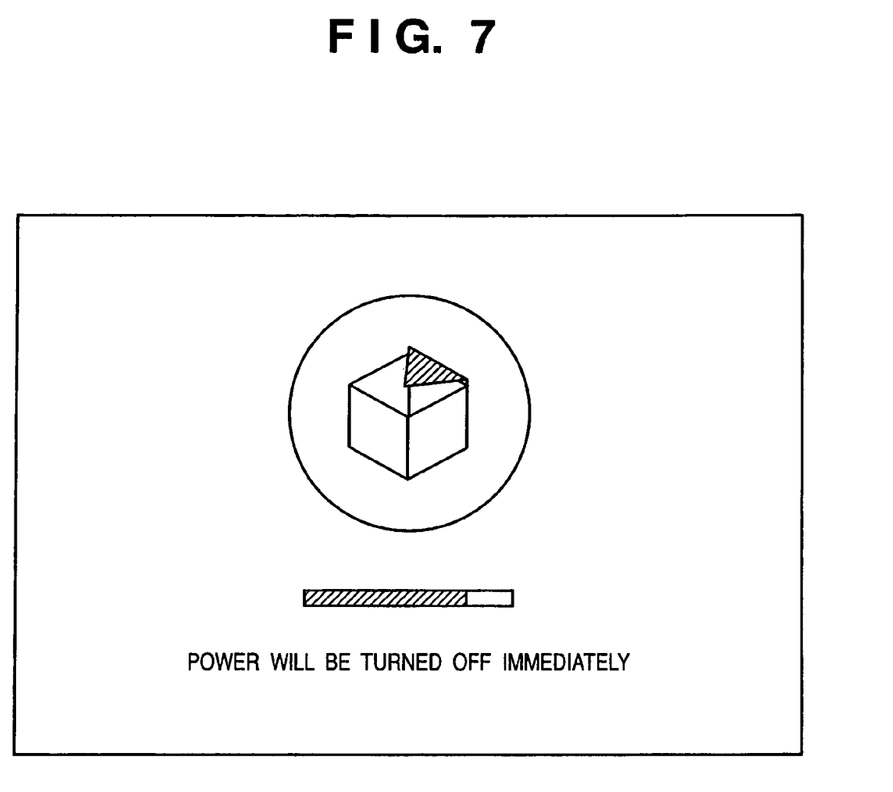
FIG. 7 is a diagram illustrating an example of display on a liquid crystal screen of the console.

If it is determined that there is no shared job, then a message notifying the user of the fact that the main power source will be now be turned off is displayed on the liquid crystal screen 210 (S504) and control is exercised so as to turn off the main power source (not shown) (S505). FIG. 7 illustrates an example of this display presented on the liquid crystal screen 210 at step S504. In regard to shutdown of the main power source, control is exercised so as to turn off the main power source by a decision rendered by the CPU 2001 included in the controller 2000. In this case, however, a hard switch connected to the main power source is changed over by, e.g., relay control to turn off the main power source automatically.

At this time the CPU 2001 transitions to control to turn off its own power supply. Accordingly, preparatory processing necessary to turn off the power supply, such as inhibiting access in order to protect the hard-disk drive 2004, is completed in advance. Further, in a case where the main power source is turned on again, the hard switch is changed over manually by the user.

Figure 8:
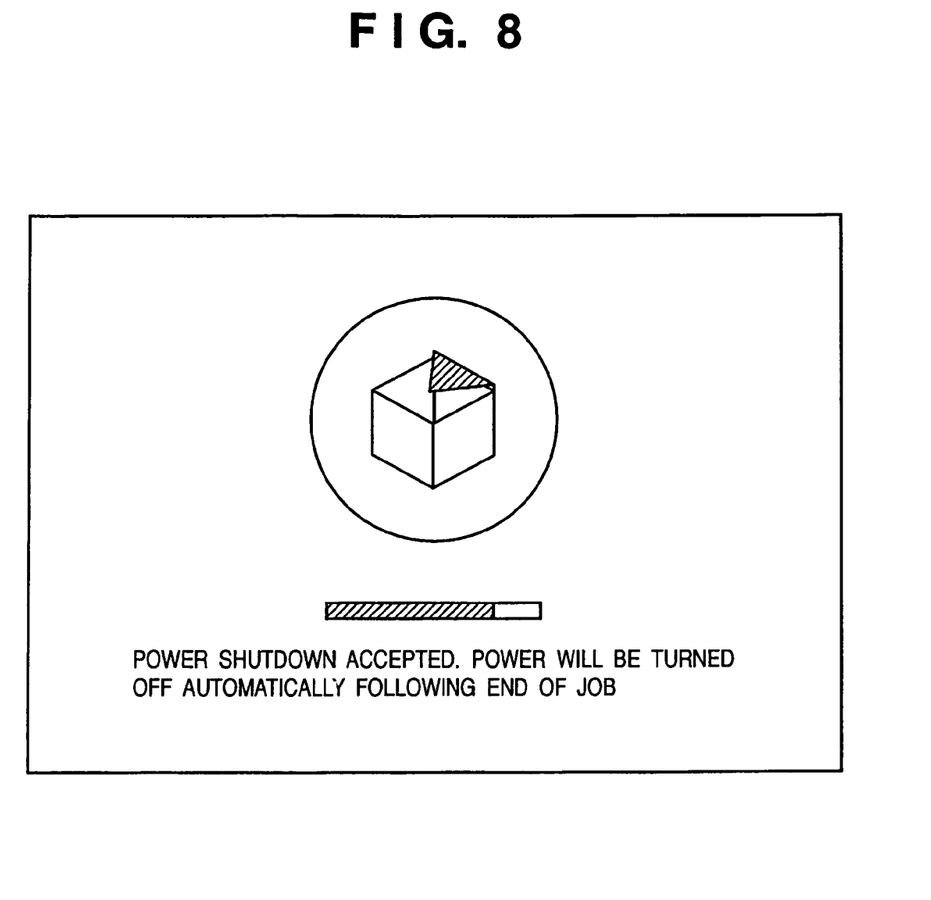
FIG. 8 is a diagram illustrating an example of display on a liquid crystal screen of the console.

On the other hand, if it is determined at S503 that a shared job exists, a message to the effect that power shutdown is accepted but that the main power source cannot be turned off immediately is displayed on the liquid crystal screen 210 (S506). FIG. 8 illustrates an example of this display presented on the liquid crystal screen 210 at step S504. As illustrated, the message may be one indicating that the power source will be turned off automatically following conclusion of the job.

Next, it is determined whether the shared job is currently being executed or whether a shared job scheduled for execution has been completed (S507). If the job has not been completed, this determination regarding job completion is repeated periodically. If it is determined that all shared jobs have been completed, then the user is informed by a screen display similar to that of FIG. 7 of the fact that the main power source will now be turned off (S508) and control is exercised so as to turn off the main power source (S509).

In regard to the determination of completion of a shared job, the remote apparatus judges that the shared job has been completed at the moment the requested job is concluded, e.g., at the moment a printout has been performed and at the moment the requested shared job has been sent back to the local apparatus.

In the case of the local apparatus, this apparatus judges that the shared job has been completed if the shared job requested in the remote apparatus has ended, e.g., if a printout has been performed. On the other hand, if the remote apparatus performs a shared job such as a format conversion, sends the electronic data back to the local apparatus and then the local apparatus subsequently performs a shared job such as transmission of e-mail, then a judgment to the effect that the job has been completed is rendered at the moment this processing ends.

As described above, this embodiment is such that in an image processing system in which a shared job is capable of being executed among a plurality of image processing apparatuses connected via a network, an operation to shutdown power in each image processing apparatus can be performed without affecting a shared job currently being executed.

In particular, this embodiment is such that the generation of a new shared job relating to the apparatus is inhibited after power shutdown is performed by the operator. If there is a shared job currently being executed or one that has been scheduled, then the main power source is turned off automatically following execution of this job. As a result, the operator can perform power shutdown without being aware of the status of shared-job execution, and the main power source is turned off without affecting the status of shared-job execution.

Second Embodiment

A second embodiment of the present invention will now be described. The second embodiment also is an image processing system similar to that of the first embodiment. Portions similar to those of the first embodiment need not be described again. The description that follows focuses primarily on the features of the second embodiment.

In the first embodiment, if there is a shared job currently being executed or one that has been scheduled, the power supply is turned off upon waiting for the end of the job. The second embodiment is such that if the system has an apparatus (a proxy apparatus) to take over the job, then the shared job currently being executed or scheduled is executed by the proxy apparatus to thereby shorten the time till power shutdown.

Figure 9:
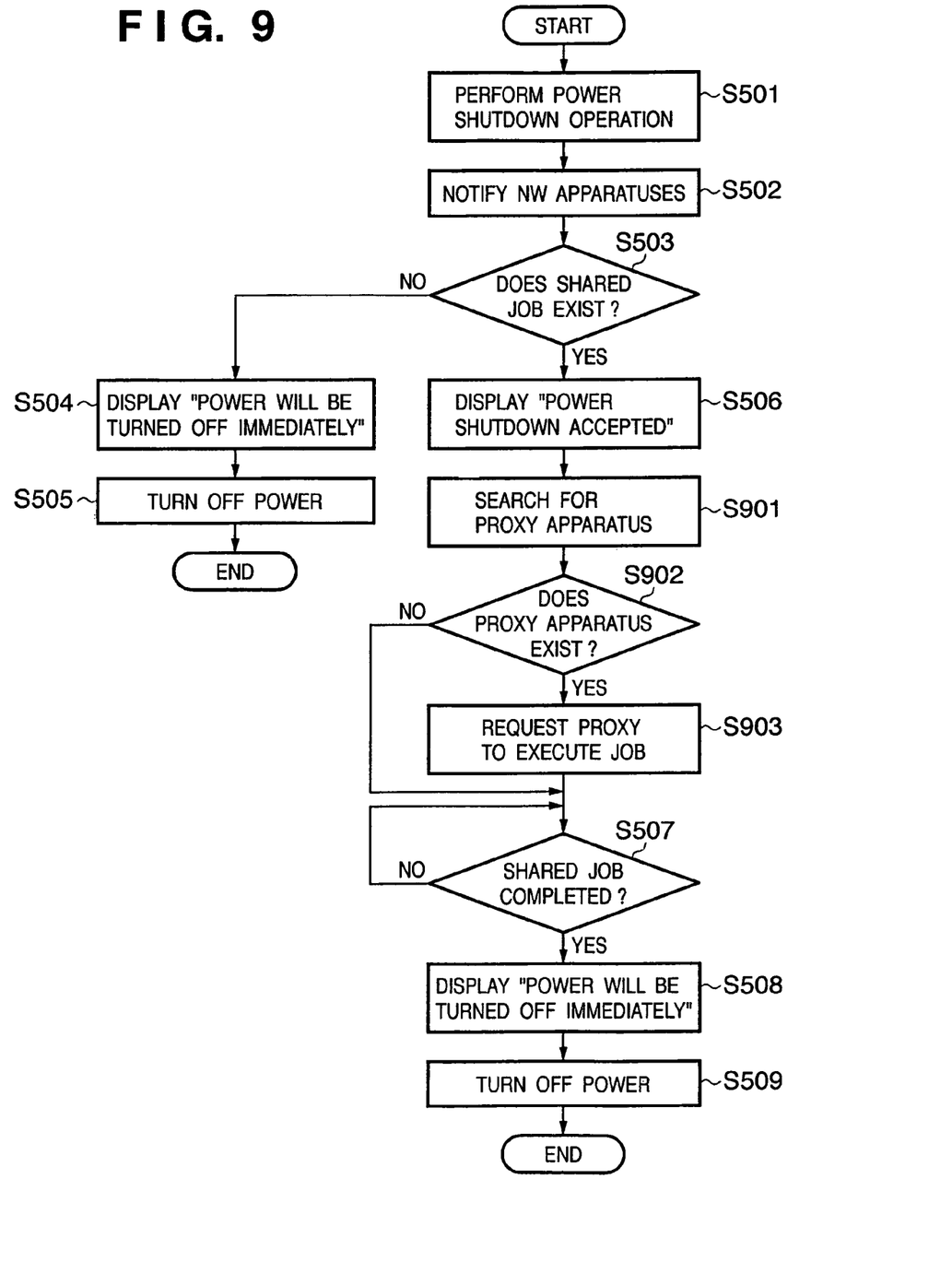
FIG. 9 is a flowchart illustrating processing executed at power shutdown in a second embodiment of the present invention.

FIG. 9 is a flowchart illustrating processing executed at power shutdown in this embodiment. Processing steps in FIG. 9 identical with those of the flowchart of FIG. 5 described in relation to the first embodiment are designated by like step numbers. These similar steps need not be described again; only the processing that differs will be described.

The flowchart of FIG. 9 differs from that of FIG. 5 in the processing that follows step S506 at which the user is notified of the fact that a shared job exists and that the main power source cannot be turned off immediately.

Processing executed at the local apparatus that requested the shared job will be examined. For example, consider a case where the local apparatus has requested the remote apparatus to execute processing for converting the format of computerized data as a shared job relating to "scan to e-mail". Here the format conversion is to PDF data, TIFF data, OCR data, JPEG data or encrypted data, etc. As far as the local apparatus is concerned, it is necessary to obtain format-converted electronic data; which apparatus performs the format conversion is not important. Accordingly, no problems arise even if the requested shared job is executed not by the apparatus that requested the job but by another apparatus connected to the network.

In view of this point, this embodiment is such that in a case where the remote apparatus has accepted power shutdown, a shared job in progress or scheduled at the remote apparatus is executed by another apparatus if this other apparatus is capable of executing the job. In other words, control is exercised to make this other apparatus act as a substitute.

In order to accomplish this, the remote apparatus that accepted power shutdown searches the other apparatuses on the network for an apparatus (proxy) that is capable of executing the requested shared job instead (S901). By way of example, this search is conducted by acquiring the information of the above-mentioned apparatus from apparatuses other than the local apparatus on the network. Based upon the acquired information of the apparatus, it is determined whether a proxy apparatus exists (S902).

If a proxy apparatus is found, then the proxy apparatus is requested to execute the shared job (S903). The timing of the request may be that when a certain processing stage among a plurality of stages has ended. Further, when execution of the job is requested, the data to be processed, the data indicating the stage of the processing and information (job ID, etc.) that the remote apparatus has received from the local apparatus are transmitted to the proxy apparatus.

After the proxy apparatus is requested to execute the shared job at S903, or if it is determined at S902 that a proxy apparatus does not exist, then it is determined whether other requested shared jobs have been completed (S507). If it is determined that all shared jobs have been completed, then, as in the first embodiment, the user is informed by a screen display similar to that of FIG. 7 of the fact that the main power source will now be turned off (S508) and control is exercised so as to turn off the main power source (S509).

In the description rendered above, processing executed when the main power source of the remote apparatus is turned off is described. However, control can be exercised so as to request a proxy apparatus to execute a shared job in a manner similar to that the local apparatus. Since it is required that the local apparatus notify the user of the result of the shared job requested, however, it is preferred that control be exercised so as to display or give notification of how the result of the shared job will be processed, or leave a log.

Thus, if a system has an apparatus (a proxy apparatus) that will take over a job when a power shutdown operation has been performed, a shared job in progress or scheduled is executed by the proxy apparatus, thereby enabling the time till power shutdown to be curtailed.

Other Embodiments

In the embodiment set forth above, a case where the present invention is applied to an image input/output apparatus having a scanner and a printer has been described as an example. However, the present invention is applicable to all types of data processing apparatus that are at least connectable to a network and have a function for processing a shared job requiring cooperative operation using another data processing apparatus. Of course, the present invention is ideal for application to a multifunction peripheral having various processing functions in addition to a data input unit and a data output unit.

Further, it may be so arranged that other additional information is displayed on the display screen (FIG. 8) which informs the user of the fact that power shutdown has been accepted but that the main power source cannot be turned off immediately. Conceivable examples of such additional information are the destination (local apparatus) of the request for execution of a shared job in progress or scheduled, the type of shared job, and the predicted time till completion of the shared job. Furthermore, it may be so arranged that the user can set whether or not such information is to be displayed.

Although the present invention has been described in detail with regard to embodiments thereof, the present invention may be applied to a system constituted by a plurality of devices or to an apparatus comprising a single device.

Furthermore, there are cases where the object of the invention is attained also by supplying a software program, which implements the functions of the foregoing embodiments, directly or remotely to a system or apparatus, reading the supplied program codes with a computer of the system or apparatus, and then executing the program codes. In the foregoing embodiments, the program corresponds to the flowchart of FIG. 5 or 9. In this case, so long as the system or apparatus has the functions of the program, the mode of implementation need not rely upon a program.

Accordingly, since the functions of the present invention are implemented by computer, the program codes per se installed in the computer also implement the present invention. In other words, the scope of the present invention also covers a computer program that is for the purpose of implementing the functions of the present invention.

In this case, so long as the system or apparatus has the functions of the program, the form of the program, e.g., object code, a program executed by an interpreter or script data supplied to an operating system, etc., does not matter.

Examples of storage media that can be used for supplying the program are a Floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and a download can be made from the website to a recording medium such as a hard disk. In this case, what is downloaded may be the computer program per se of the present invention or a file that contains automatically installable compressed functions. Further, implementation is possible by dividing the program codes constituting the program of the present invention into a plurality of files and downloading the files from different websites. In other words, a WWW (World Wide Web) server that downloads, to multiple users, the program files that implement the functional processing of the present invention by computer also is covered by the scope of the present invention.

Further, it is also possible to encrypt and store the program of the present invention on a storage medium such as a CD-ROM and distribute the storage medium to users. In this case, users who meet certain requirements are allowed to download decryption key information from a website via the Internet, and the program decrypted using this key information is installed on a computer in executable form.

Further, implementation of the functions is possible also in a form other than one in which the functions of the foregoing embodiments are implemented by having a computer execute a program that has been read. For example, based upon indications in the program, an operating system or the like running on the computer may perform all or a part of the actual processing so that the functions of the foregoing embodiments can be implemented by this processing.

Furthermore, it may be so arranged that a program that has been read from a storage medium is written to a memory provided on a function expansion board inserted into the computer or provided in a function expansion unit connected to the computer. In this case, a CPU or the like provided on the function expansion board or function expansion unit performs some or all of the actual processing based upon the indications in the program and the functions of the foregoing embodiments are implemented by this processing.

In accordance with the present invention, whether a shared job currently being executed or whose execution is scheduled exists can be ascertained in an image processing apparatus designated for power shutdown by the user. In addition, power shutdown is controlled in accordance with the state of execution of a shared job, i.e., in accordance with whether execution of the job has been completed or not. As a result, power shutdown during execution of a shared job is prevented.

This means that a user can designate power shutdown without being concerned about the state of execution of shared job. Operability is enhanced as a result.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-244747 filed on Aug. 25, 2005, which is hereby incorporated by reference herein in its entirety.

What is claimed is:

1. A data processing apparatus capable of processing both a shared job requiring cooperative operation using a second data processing apparatus and a local job which does not need the cooperative operation, comprising:
    an acceptance unit that accepts from an operator, a shutdown request to shut down a power supply of said data processing apparatus; and
    a controller that, according to acceptance of the shutdown request,
        in a case where the shared job to be processed by said data processing apparatus exists in the data processing apparatus, shuts down the power supply following an end of processing the shared job,
        in a case where the shared job does not exist, shuts down the power supply immediately even if the local job to be processed by said data processing apparatus exists in the data processing apparatus, and
        in a case where the shared job to be processed by said data processing apparatus exists and, moreover, the second data processing apparatus that is capable of processing the shared job exists, shuts down the power supply after the second data processing apparatus is requested to process the shared job,
    wherein the shared job requires one of at least scanning operation, copying operation, printing operation and facsimile operation.

2. The data processing apparatus according to claim 1, further comprising
    a display controller that causes a user interface unit to present a display that indicates operating status of said data processing apparatus,
    wherein in a case where the shutdown request has been accepted, said display controller causes the user interface unit to present a display that indicates content based upon whether the shared job to be processed by said data processing apparatus exists.

3. The data processing apparatus according to claim 1, wherein said controller inhibits acceptance of a new shared job processing request in a case where the shutdown request has been issued by the operator.

4. The data processing apparatus according to claim 2, wherein
    in a case where the shared job to be processed by said data processing apparatus does not exist, said display controller causes the user interface unit to present a display indicating that the power supply will be shut down immediately, and
    in a case where the shared job to be processed by said data processing apparatus exists, said display controller causes the user interface unit to present a display indicating that the shutdown request has been accepted.

5. The data processing apparatus according to claim 4, wherein said display controller causes the user interface unit to present a display indicating that the power supply will be shut down immediately before shutdown of the power supply is performed in a case where the display indicating that the shutdown request has been accepted has been presented.

6. The data processing apparatus according to claim 1, wherein the shared job is a job requiring processing for transmitting data to the second data processing apparatus.

7. The data processing apparatus according to claim 1, wherein said data processing apparatus has at least one of a data input unit for inputting data from a document reader, and a printer unit for executing data print processing.

8. The data processing apparatus according to claim 1, wherein the shared job is at least one of a job processed by a plurality of data processing apparatuses that share a printing operation, and a job requiring transmission of data, which is necessary for a printing operation solely by the other second data processing apparatus, from said data processing apparatus.

9. A control method for a data processing apparatus capable of processing both a shared job requiring cooperative operation using a second data processing apparatus and a local job that does not need the cooperative operation, comprising the steps of:
    accepting from an operator, a shutdown request to shut down a power supply of the data processing apparatus; and
    according to acceptance of the shutdown request,
        in a case where the shared job to be processed by the data processing apparatus exists in the data processing apparatus, shutting down the power supply following an end of processing the shared job,
        in a case where the shared job does not exist, shutting down the power supply immediately even if the local job to be processed by the data processing apparatus exists in the data processing apparatus, and
        in a case where the shared job to be processed by said data processing apparatus exists and, moreover, the second data processing apparatus that is capable of processing the shared job exists, shuts down the power supply after the second data processing apparatus is requested to process the shared job,
    wherein the shared job requires one of at least scanning operation, copying operation, printing operation and facsimile operation.

10. The data processing method according to claim 9, further comprising the step of:
    causing a user interface unit to present a display that indicates operating status of the data processing apparatus,
    wherein in a case where the shutdown request has been accepted, causing the user interface unit to present a display that indicates content based upon whether the shared job to be processed by the data processing apparatus exists.

11. The data processing method according to claim 9, further comprising a step of inhibiting acceptance of a new shared job processing request in a case where the shutdown request has been issued by the operator.

12. The data processing method according to claim 10, further comprising the steps of:
    causing, in a case where the shared job to be processed by the data processing apparatus does not exist, the user interface unit to present a display indicating that the power supply will be shut down immediately; and
    causing, in a case where the shared job to be processed by the data processing apparatus exists, the user interface unit to present a display indicating that the shutdown request has been accepted.

13. The data processing method according to claim 12, further comprising the step of:
    causing the user interface unit to present a display indicating that the power supply will be shut down immediately before shutdown of the power supply is performed in a case where the display indicating that the shutdown request has been accepted has been presented.

14. The data processing method according to claim 9, wherein the shared job is a job requiring processing for transmitting data to the second data processing apparatus.

15. The data processing method according to claim 9, wherein the data processing apparatus has at least one of a data input unit for inputting data from a document reader, and a printer unit for executing data print processing.

16. The data processing method according to claim 9, wherein the shared job is at least one of a job processed by a plurality of data processing apparatuses that share a printing operation, and a job requiring transmission of data, which is necessary for a printing operation solely by the second data processing apparatus, from the data processing apparatus.

17. A system capable of processing both a shared job requiring cooperative operation using a plurality of data processing apparatuses, including a data processing apparatus, and a local job which does not need the cooperative operation and is to be processed by the data processing apparatus, comprising:
   an acceptance unit that accepts from an operator, a shutdown request to shut down a power supply of the data processing apparatus capable of processing the shared job; and
   a controller that,
      in a case where the shared job to be processed by the data processing apparatus exists in the data processing apparatus, shuts down the power supply following an end of processing the shared job,
      in a case where the shared job does not exist, shuts down the power supply immediately even if the local job to be processed by the data processing apparatus exists in the data processing apparatus in the data processing apparatus, and
      in a case where the shared job to be processed by said data processing apparatus exists and, moreover, the second data processing apparatus that is capable of processing the shared job exists, shuts down the power supply after the second data processing apparatus is requested to process the shared job,
   wherein the shared job requires one of at least scanning operation, copying operation, printing operation and facsimile operation.

18. A non-transitory computer-readable recording medium on which a program has been recorded for causing a computer to execute the control method set forth in claim 9.

19. A non-transitory computer-readable recording medium on which a program has been recorded for causing a computer to execute the control method set forth in claim 10.

20. A non-transitory computer-readable recording medium on which a program has been recorded for causing a computer to execute the control method set forth in claim 11.

21. A non-transitory computer-readable recording medium on which a program has been recorded for causing a computer to execute the control method set forth in claim 12.

22. A non-transitory computer-readable recording medium on which a program has been recorded for causing a computer to execute the control method set forth in claim 13.

23. A non-transitory computer-readable recording medium on which a program has been recorded for causing a computer to execute the control method set forth in claim 14.

24. A non-transitory computer-readable recording medium on which a program has been recorded for causing a computer to execute the control method set forth in claim 15.

25. A non-transitory computer-readable recording medium on which a program has been recorded for causing a computer to execute the control method set forth in claim 16.

* * * * *